United States Patent
Wu et al.

(10) Patent No.: US 11,847,969 B2
(45) Date of Patent: Dec. 19, 2023

(54) PIXEL DRIVING CIRCUIT AND METHOD FOR DRIVING THE SAME, DISPLAY PANEL, AND DISPLAY DEVICE

(71) Applicant: WUHAN TIANMA MICROELECTRONICS CO., LTD., Wuhan (CN)

(72) Inventors: Jiao Wu, Wuhan (CN); Maoqing Zhou, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 17/858,716

(22) Filed: Jul. 6, 2022

(65) Prior Publication Data

US 2022/0343849 A1   Oct. 27, 2022

(30) Foreign Application Priority Data

Mar. 23, 2022   (CN) .......................... 202210291098.5

(51) Int. Cl.
  *G09G 3/3233*   (2016.01)
(52) U.S. Cl.
  CPC ... *G09G 3/3233* (2013.01); *G09G 2300/0426* (2013.01); *G09G 2310/061* (2013.01)
(58) Field of Classification Search
  CPC ......... G09G 3/3233; G09G 2300/0426; G09G 2310/061; G09G 2310/0264; G09G 2320/0626
  See application file for complete search history.

(56) References Cited

U.S. PATENT DOCUMENTS

| | | | |
|---|---|---|---|
| 11,322,087 B1* | 5/2022 | Beard | G09G 3/3233 |
| 2018/0286313 A1* | 10/2018 | Zheng | G09G 3/3258 |
| 2020/0211464 A1* | 7/2020 | Yue | G09G 3/3266 |
| 2020/0312244 A1* | 10/2020 | Yang | G09G 3/3233 |
| 2021/0201760 A1* | 7/2021 | Wang | G09G 3/3233 |
| 2021/0225262 A1* | 7/2021 | Liu | G09G 3/2022 |
| 2021/0366364 A1* | 11/2021 | Xuan | G09G 3/2074 |

FOREIGN PATENT DOCUMENTS

| | | |
|---|---|---|
| CN | 105302220 B | 8/2016 |
| CN | 110473496 A | 11/2019 |
| CN | 110728946 A | 1/2020 |
| CN | 111402799 A | 7/2020 |
| CN | 112562589 A | 3/2021 |

OTHER PUBLICATIONS

First Chinese Office Action dated Oct. 8, 2022, issued in corresponding Chinese Application No. 202210291098.5, filed on Mar. 23, 2022, and its English translation thereof.

* cited by examiner

*Primary Examiner* — Jeff Piziali
(74) *Attorney, Agent, or Firm* — CHRISTENSEN O'CONNOR JOHNSON KINDNESS PLLC

(57) ABSTRACT

A pixel driving circuit and a method for driving the same, a display panel, and a display device are described. The pixel driving circuit includes a driving circuit and a light-adjusting circuit. The driving circuit is configured to provide a light-emitting current to a light-emitting element. The light-adjusting circuit is arranged between the driving circuit and the light-emitting element, and configured to adjust a value of the light-emitting current.

17 Claims, 15 Drawing Sheets

Step B1: During a light-adjusting stage, transmitting a light-adjusting voltage by the light-adjusting signal line, and adjusting, by the light-adjusting circuit, a value of the light-emitting current under the light-adjusting voltage

FIG. 13

Step B1: During a light-adjusting stage, transmitting a light-adjusting voltage by the light-adjusting signal line, and adjusting, by the light-adjusting circuit, a value of the light-emitting current under the light-adjusting voltage Step B2: During a normal light-emitting stage, transmitting, by the light-adjusting signal line, the light-adjusting voltage that is equal to a voltage of an input terminal of the light-adjusting circuit

FIG. 14

PIXEL DRIVING CIRCUIT AND METHOD FOR DRIVING THE SAME, DISPLAY PANEL, AND DISPLAY DEVICE

CROSS-REFERENCE TO RELATED APPLICATIONS

The present application claims priority to Chinese Patent Application No. 202210291098.5, filed on Mar. 23, 2022, the content of which is incorporated herein by reference in its entirety.

TECHNICAL FIELD

The present disclosure relates to the field of display technology, and, in particular, to a pixel driving circuit and a method for driving the same, a display panel, and a display device.

BACKGROUND

In order to adapt to different application situations, a display panel can have a function of brightness adjustment while achieving normal image display. In the related art, for organic light-emission displaying, there are two methods for adjusting brightness: one method is direct current (DC) light adjustment in which a driving transistor generates driving currents having different values by adjusting a data voltage or a power voltage to achieve adjustment of display brightness, and another method is pulse width modulation (PWM) light adjustment in which a light-emitting period is controlled by changing a pulse number and a pulse width of a switch signal of a transistor that is required to be turned on during a light-emitting stage, to achieve adjustment of display brightness.

In the PWM light adjustment method, when an adjustment frequency is low, frequent flickering of the display panel is harmful to human eyes. In the DC light adjustment method, display quality is greatly affected by fluctuation of a sub-threshold swing because a driving current of a driving transistor is small at low brightness, thereby leading to a poor display effect.

SUMMARY

In a first aspect, some embodiments of the present disclosure provide a pixel driving circuit. The pixel driving circuit includes a driving circuit and a light-adjusting circuit. The driving circuit is configured to provide a light-emitting current to a light-emitting element. The light-adjusting circuit is arranged between the driving circuit and the light-emitting element and configured to adjust a value of the light-emitting current.

In a second aspect, some embodiments of the present disclosure provide a method for driving a pixel driving circuit. The pixel driving circuit includes a driving circuit and a light-adjusting circuit. The driving circuit is configured to provide a light-emitting current to a light-emitting element. The light-adjusting circuit is arranged between the driving circuit and the light-emitting element and configured to adjust a value of the light-emitting current. The method includes: during a light-adjusting stage, transmitting a light-adjusting voltage by the light-adjusting signal line, and adjusting, by the light-adjusting circuit, a value of the light-emitting current by the light-adjusting voltage.

In a third aspect, some embodiments of the present disclosure provide a display panel including a pixel driving circuit. The pixel driving circuit includes a driving circuit and a light-adjusting circuit. The driving circuit is configured to provide a light-emitting current to a light-emitting element. The light-adjusting circuit is arranged between the driving circuit and the light-emitting element and configured to adjust a value of the light-emitting current.

In a fourth aspect, some embodiments of the present disclosure provide a display device including the display panel described in the third aspect.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, other drawings can also be acquired by those skilled in the art.

FIG. 13 is a flowchart of a method for driving a pixel driving circuit according to some embodiments of the present disclosure;

FIG. 14 is a flowchart of another method for driving a pixel driving circuit according to some embodiments of the present disclosure;

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there can be three relationships, for example, A and/or B can indicate that three cases, i.e., A alone, A and B, B alone. The character "/" herein generally indicates that the related objects before and after the character form an "or" relationship.

In the description of this specification, it should be understood that the terms "substantially", "basically" "approximately", "about", "almost" and "roughly" described in the claims and embodiments of the present disclosure indicates a value that can be generally agreed within a reasonable process operation range or tolerance range, rather than an exact value.

It should be understood that although the transistor, electrode and the like can be described using the terms of "first", "second", etc., in the embodiments of the present disclosure, the transistors, electrode plates and the like will not be limited to these terms. These terms are merely used to distinguish transistors, electrode plates and the like from one another. For example, without departing from the scope of the embodiments of the present disclosure, a first transistor can also be referred to as a second transistor, similarly, a second transistor can also be referred to as a first transistor.

It will be apparent to those skilled in the art that various modifications and variations can be made in the present disclosure without departing from the scope of the present disclosure. Accordingly, the present disclosure is intended to cover the modifications and variations of the present disclosure that fall within a scope of corresponding claims (claimed technical solutions) and their equivalents.

Figure 1:
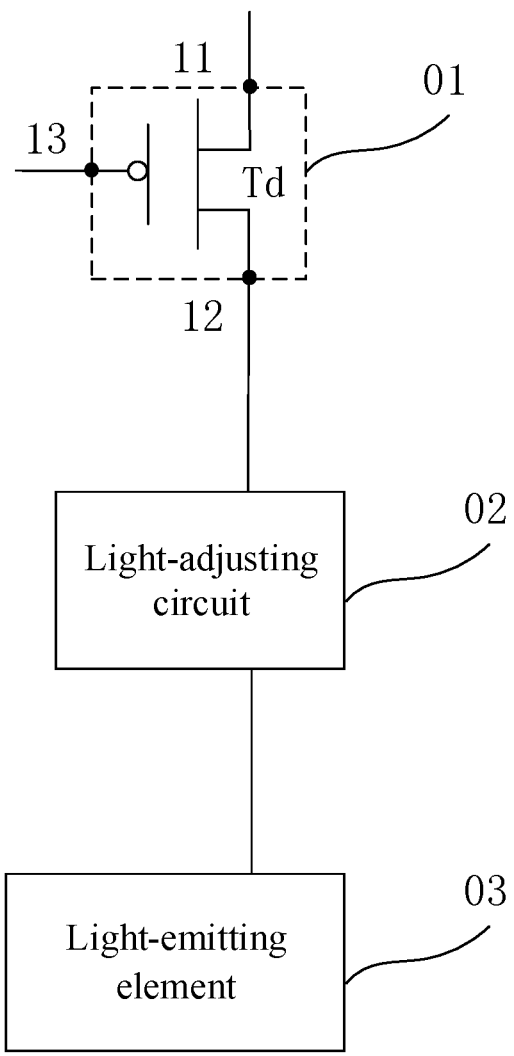
FIG. 1 is a schematic diagram illustrating a portion of a pixel driving circuit according to some embodiments of the present disclosure.

FIG. 1 is a schematic diagram illustrating a portion of a pixel driving circuit according to some embodiments of the present disclosure.

Some embodiments of the present disclosure provide a pixel driving circuit 001. As shown in FIG. 1, the pixel driving circuit 001 includes a driving circuit 01 and a light-adjusting circuit 02. The driving circuit 01 is configured to provide a light-emitting current to a light-emitting element 03, and the light-emitting element 03 is configured to generate brightness corresponding to the light-emitting current received by the light-emitting element 03.

In some embodiments of the present disclosure, the driving circuit 01 includes a driving transistor Td configured to provide a light-emitting current to the light-emitting element 03.

The driving transistor Td can generate a light-emitting current based on a power voltage and a data voltage that are received by the driving transistor Td, that is, a value of the light-emitting current generated by the driving transistor Td is related to values of a power voltage and a data voltage that are received by the driving transistor Td.

The light-adjusting circuit 02 is arranged between the driving circuit 01 and the light-emitting element 03. The light-emitting current provided by the driving circuit 01 to the light-emitting element 03 flows through the light-adjusting circuit 02. The light-adjusting circuit 02 is configured to adjust the value of the light-emitting current. That is, the light-adjusting circuit 02 adjusts the brightness of the light-emitting element 03 by adjusting the value of the light-emitting current transmitted to the light-emitting element 03.

In some embodiments of the present disclosure, the light-adjusting circuit 02 can include a junction field effect transistor. The junction field effect transistor can change conductivity of a channel based on its received voltage, thereby controlling an output current. That is, the value of the light-emitting current output from the junction field effect transistor can be adjusted by controlling the conductivity of the channel of the junction field effect transistor. That is, the light-emitting current generated by the driving circuit 01 and transmitted to the light-emitting element 03 can be adjusted by controlling the conductivity of the junction field effect transistor, thereby achieving brightness adjustment of the light-emitting element 03.

If the brightness of the light-emitting element 03 is adjusted only by controlling the value of the light-emitting current generated by the driving transistor Td, when preset brightness of the light-emitting element 03 is relatively low, the light-emitting current generated by the driving transistor Td is relatively small, and the relatively small light-emitting current is greatly affected by a fluctuation of sub-threshold swing of the driving transistor Td. As a result, the final light-emitting brightness of light-emitting element 03 is different from a preset light-emitting brightness and it is difficult to compensate the final light-emitting brightness, resulting in a poor display effect of the display panel. The sub-threshold swing is a performance indicator that indicates a mutual transition rate between a turn-on state and a turn-off state of a transistor, and the sub-threshold swing represents an amount of change in a voltage of a gate required to change a source-drain current of the transistor by an order of magnitude. When the light-emitting current generated by the driving transistor Td is relatively small, a fluctuation of the sub-threshold swing of the driving transistor Td causes a significant difference between an actual value of an output light-emitting current and a preset value of the light-emitting current.

The pixel driving circuit 001 provided by the present disclosure can avoid the above problems. For example, when the preset brightness of the light-emitting element 03 is relatively low, the driving circuit 01 can generate a relatively large light-emitting current, and the light-emitting current output by the junction field effect transistor can be reduced by reducing the conductivity of the channel of the junction field effect transistor. That is, the light-emitting current transmitted to the light-emitting element 03 can be reduced by reducing the conductivity of the channel of the junction field effect transistor, so that the light-emitting element 03 can achieve a preset low brightness.

In some embodiments of the present disclosure, the light-emitting element 03 is an organic light-emitting diode.

In the embodiments of the present disclosure, a light-adjusting circuit 02 is connected in series between the driving circuit 01 and the light-emitting element 03, and is configured to adjust the value of the light-emitting current generated by the driving circuit 01 and transmitted to the light-emitting element 03, thereby achieving brightness adjustment of the light-emitting element 03. For the pixel driving circuit 001 provided by the embodiments of the present disclosure, it is not necessary to adjust the brightness of the light-emitting element 03 by controlling a value of the light-emitting current generated by the driving circuit 01 itself. Therefore, a problem that the driving transistor Td is affected by fluctuation of the sub-threshold swing can be avoided when the driving transistor Td in the driving circuit 01 generates a small light-emitting current to achieve low light-emitting brightness of the light-emitting element 03. Therefore, the pixel driving circuit 001 provided by the embodiments of the present disclosure can provide a stable and ideal light-emitting current to the light-emitting element 03, so that the light-emitting brightness of the light-emitting element 03 is approximately with the same as the preset value.

Figure 2:
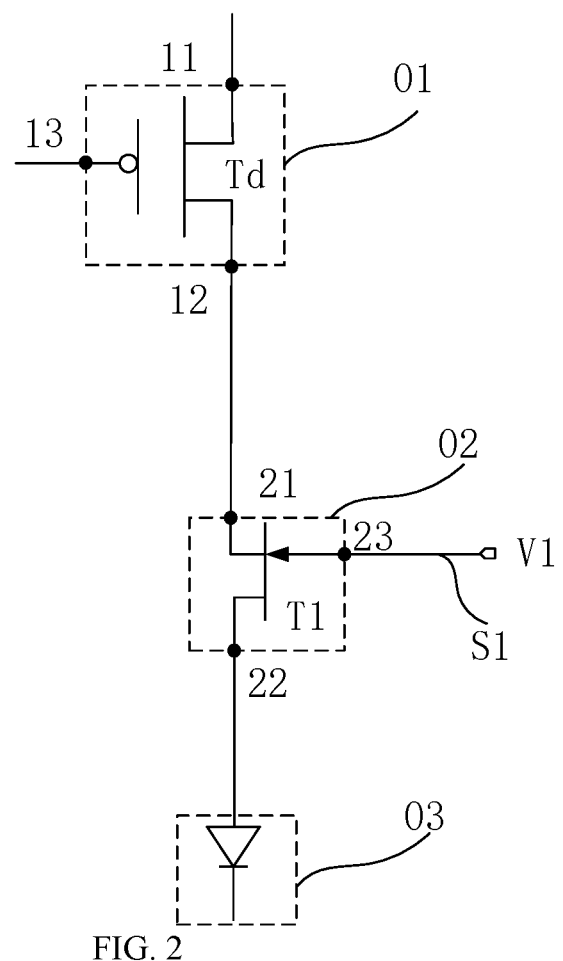
FIG. 2 is a schematic diagram illustrating a portion of another pixel driving circuit according to some embodiments of the present disclosure.
Figure 3:
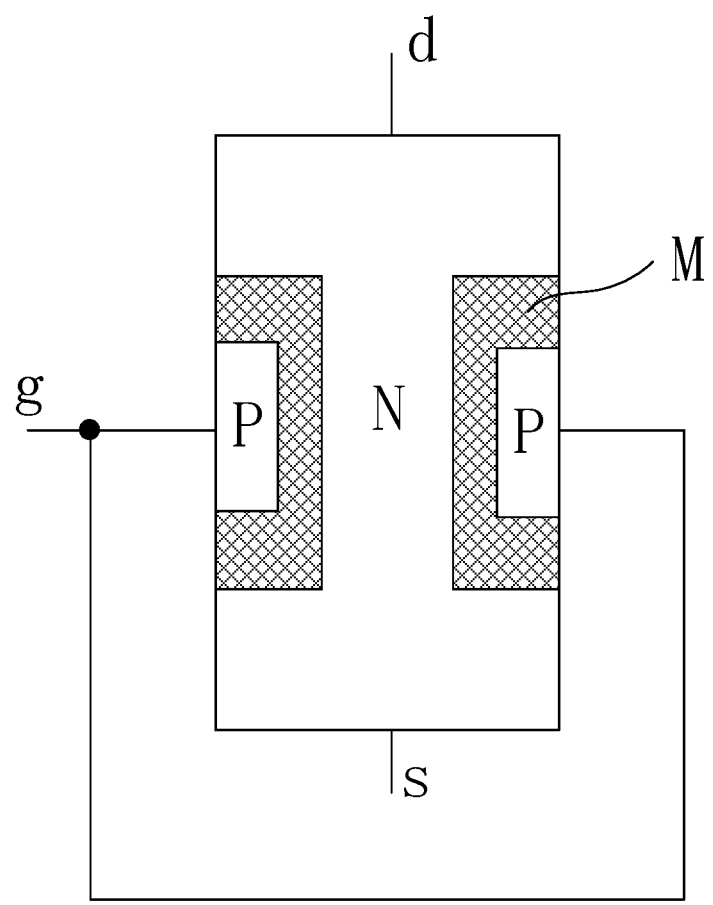
FIG. 3 is a schematic diagram illustrating a junction field effect transistor shown in FIG. 2 according to some embodiments of the present disclosure.
Figure 4:
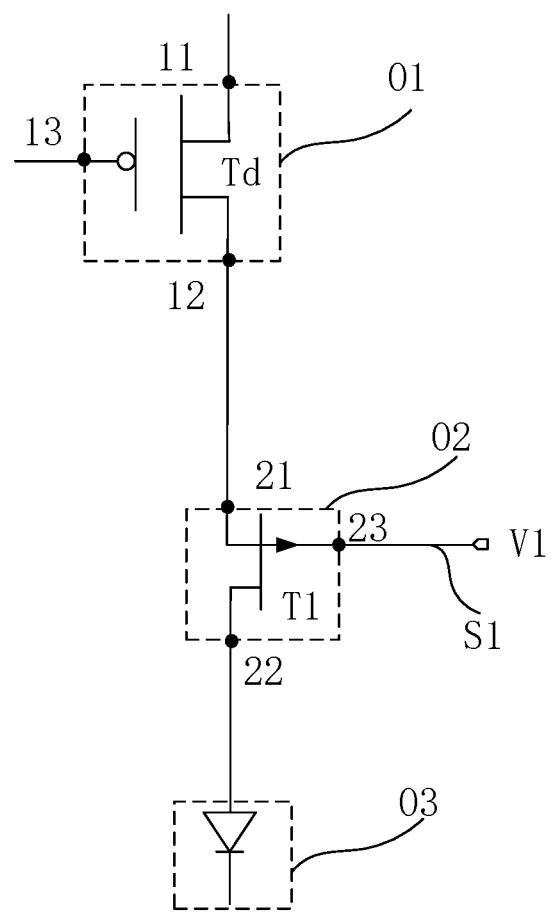
FIG. 4 is a schematic diagram illustrating a portion of another pixel driving circuit according to some embodiments of the present disclosure.
Figure 5:
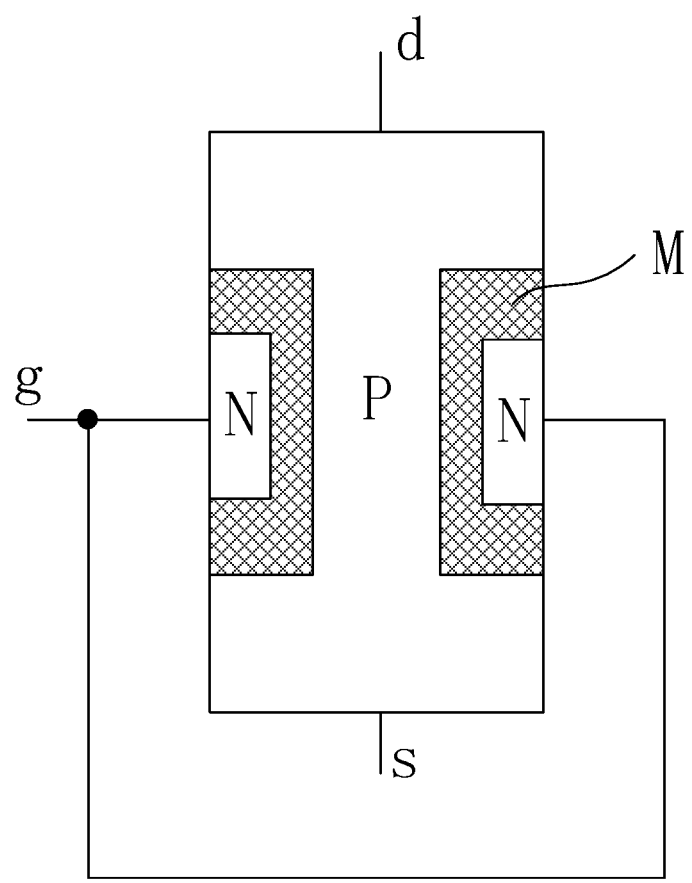
FIG. 5 is a schematic diagram illustrating a junction field effect transistor shown in FIG. 4 according to some embodiments of the present disclosure.

FIG. 2 is a schematic diagram illustrating a portion of another pixel driving circuit according to some embodiments of the present disclosure; FIG. 3 is a schematic diagram illustrating a junction field effect transistor shown in FIG. 2; FIG. 4 is a schematic diagram illustrating a portion of another pixel driving circuit according to some embodiments of the present disclosure; and FIG. 5 is a schematic diagram illustrating a junction field effect transistor shown in FIG. 4.

As shown in FIG. 2 and FIG. 4, in some embodiments of the present disclosure, the light-adjusting circuit 02 includes a control terminal 23 electrically connected to a light-adjusting signal line S1, and the light-adjusting signal line S1 is configured to provide a light-adjusting voltage V1 to the light-adjusting circuit 02. During a light-adjusting stage, the light-adjusting circuit 02 adjusts the value of the light-emitting current based on the light-adjusting voltage V1 received by the light-adjusting circuit 02.

The light-adjusting stage is one light-emitting stage of multiple light-emitting stages of the pixel driving circuit 001, and during the one light-emitting stage, light adjusting is performed.

In some embodiments of the present disclosure, with reference to FIG. 2 and FIG. 4, the light-adjusting circuit 02 includes a junction field effect transistor T1, and the junction field effect transistor T1 includes a first electrode electrically connected to an input terminal 21 of the light-adjusting circuit 02, a second electrode electrically connected to an output terminal 22 of the light-adjusting circuit 02, and a gate electrically connected to a control terminal 23 of the light-adjusting circuit 02.

That is, the junction field effect transistor T1 is connected in series between the driving circuit 01 and the light-emitting element 03, and the gate of the junction field effect transistor T1 is electrically connected to the light-adjusting signal line S1.

During the light-adjusting stage, the junction field effect transistor T1 adjusts the value of the light-emitting current based on the light-adjusting voltage V1 received by the junction field effect transistor T1.

According to the characteristics of the junction field effect transistor T1, the junction field effect transistor T1 can change the conductivity of the channel of the junction field effect transistor T1 based on the voltage received by the junction field effect transistor T1, to control an output current. That is, by controlling the conductivity of the channel of the junction field effect transistor T1, the value of the light-emitting current output from the junction field effect transistor T1 can be adjusted, to adjust brightness of the light-emitting element 03. From a connection of the junction field effect transistor T1, it can be seen that, during the light-adjusting stage, a potential of the first electrode of the junction field effect transistor T1 can approximately reach a potential of a power voltage. Therefore, in the embodiments of the present disclosure, adjustment of the light-emitting current can be achieved by only controlling the light-adjusting voltage V1 received by the gate of the junction field effect transistor T1.

In some embodiments of the present disclosure, the junction field effect transistor T1 is an N-channel junction field effect transistor. During the light-adjusting stage, the light-adjusting voltage V1 transmitted by the light-adjusting signal line S1 is smaller than the voltage received by the first electrode of the junction field effect transistor T1.

In some embodiments of the present disclosure, the junction field effect transistor T1 has a structure shown in FIG. 3. In the N-channel junction field effect transistor, a layer of low-doped N-region is arranged between two highly doped P-regions, thereby forming two PN junctions, namely a depletion layer M. Electrodes are led out from two ends of the N-region, respectively. That is, a source s and a drain d. Two P-regions are connected in parallel, and one electrode is led out and is named as a gate g. The N-region located between two PN junctions is a current channel, which is named as a conductive channel.

In some embodiments of the present disclosure, the first electrode of the junction field effect transistor T1 can be the source s, the second electrode of the junction field effect transistor T1 can be the drain d, a voltage between the second electrode and the first electrode of the junction field effect transistor T1 is Vds, and a voltage between the gate and the first electrode of the junction field effect transistor T1 is Vgs.

When the voltage Vgs between the gate and the first electrode of the junction field effect transistor T1 is smaller than 0, the depletion layer M is subjected to a reverse voltage, and the voltage Vgs between the gate and the first electrode of the junction field effect transistor T1 can control a width of the depletion layer M, thereby controlling a width of the conductive channel.

When the voltage Vgs between the gate and the first electrode of the junction field effect transistor T1 is equal to 0, the width of the depletion layer M is the smallest, and the width of the conductive channel is the largest. When Vgs<0, and |Vgs| gradually increases, the width of the depletion layer M gradually increases under the reverse voltage Vgs, and the depletion layer M expands to the N-region due to that a doping concentration of the N-region is smaller than a doping concentration of the P-region, resulting in gradually decrease of the width of the conductive channel and gradually increase of a resistance of the conductive channel. When |Vgs| increases to a certain value, the depletion layer M is closed, the conductive channel disappears, the resistance of the conductive channel tends to be infinite, and the Vgs at this time is a pinch-off voltage.

In the embodiments of the present disclosure, during the light-adjusting stage, by controlling the voltage between the gate and the first electrode of the junction field effect transistor T1 to be smaller than 0, that is, by controlling the light-adjusting voltage V1 transmitted by the light-adjusting signal line to be smaller than a voltage received by the first electrode of the junction field effect transistor T1, a resistance of the conductive channel of the junction field effect transistor T1 can be adjusted, thereby achieving adjustment of the light-emitting current that flows through the junction field effect transistor T1. That is, by adjusting the value of the light-emitting current generated by the driving circuit 01 and transmitted to the light-emitting element 03, the brightness of the light-emitting element 03 can be adjusted.

During the light-adjusting stage, to ensure that the light-emitting element 03 emits light, the voltage Vgs between the gate and the first electrode of the junction field effect transistor T1 can be greater than the pinch-off voltage.

During the light-adjusting stage, the potential of the first electrode of the junction field effect transistor T1 can be a potential of the power voltage received by the pixel driving circuit 001, and the junction field effect transistor T1 adjusts the light-emitting current based on the light-adjusting voltage V1 received by the junction field effect transistor T1.

In other embodiments of the present disclosure, the junction field effect transistor T1 is a P-channel junction field effect transistor. During the light-adjusting stage, the light-adjusting voltage V1 transmitted by the light-adjusting signal line is greater than the voltage received by the first electrode of the junction field effect transistor T1.

In some embodiments of the present disclosure, the junction field effect transistor T1 has a structure as shown in FIG. 5. As shown in FIG. 5, a layer of low-doped P-region is arranged between two highly doped N-Regions, thereby forming two PN junctions, namely a depletion layer M. Electrodes are led out from two ends of the P-region, respectively, that is, a source s and a drain d. Two N-regions are connected in parallel, and one electrode is led out and is named as a gate g. The P-region located between the two PN junctions is a current channel, which is named as a conductive channel.

In some embodiments of the present disclosure, the first electrode of the junction field effect transistor T1 can be the source s, the second electrode of the junction field effect transistor T1 can be the drain d, the voltage between the second electrode and the first electrode of the junction field effect transistor T1 is Vds, and a voltage between the gate and the first electrode of the junction field effect transistor T1 is Vgs.

When the voltage Vgs between the gate and the first electrode of the junction field effect transistor T1 is greater than 0, the depletion layer M is subjected to a reverse voltage, and the voltage Vgs between the gate and the first electrode of the junction field effect transistor T1 can control a width of the depletion layer M, thereby controlling a width of the conductive channel.

When the voltage Vgs between the gate and the first electrode of the junction field effect transistor T1 is equal to 0, the width of the depletion layer M is the smallest, and the width of the conductive channel is the largest. When Vgs>0, and Vgs gradually increases, the width of the depletion layer M gradually increases under the reverse voltage Vgs, and the depletion layer M expands to the P-region due to that a doping concentration of the P-region is smaller than a doping concentration of the N-region, resulting in gradually decrease of the width of the conductive channel and gradually increase of a resistance of the conductive channel. When Vgs increases to a certain value, the depletion layer M is closed, the conductive channel disappears, the resistance of the conductive channel tends to be infinite, and the Vgs at this time is a pinch-off voltage.

In the embodiments of the present disclosure, during the light-adjusting stage, by controlling the voltage between the gate and the first electrode of the junction field effect transistor T1 to be greater than 0, that is, by controlling the light-adjusting voltage V1 transmitted by the light-adjusting signal line to be greater than a voltage received by the first electrode of the junction field effect transistor T1, a resistance of the conductive channel of the junction field effect transistor T1 can be adjusted, thereby achieving adjustment of the light-emitting current that flows through the junction field effect transistor T1. That is, by adjusting the value of the light-emitting current generated by the driving circuit 01 and transmitted to the light-emitting element 03, the brightness of the light-emitting element 03 can be adjusted.

During the light-adjusting stage, to ensure that the light-emitting element 03 emits light, the voltage Vgs between the gate and the first electrode of the junction field effect transistor T1 can be smaller than the pinch-off voltage.

During the light-adjusting stage, the potential of the first electrode of the junction field effect transistor T1 can be a potential of the power voltage received by the pixel driving circuit 001, and the junction field effect transistor T1 adjusts the light-emitting current based on the light-adjusting voltage V1 received by the junction field effect transistor T1.

Figure 6:
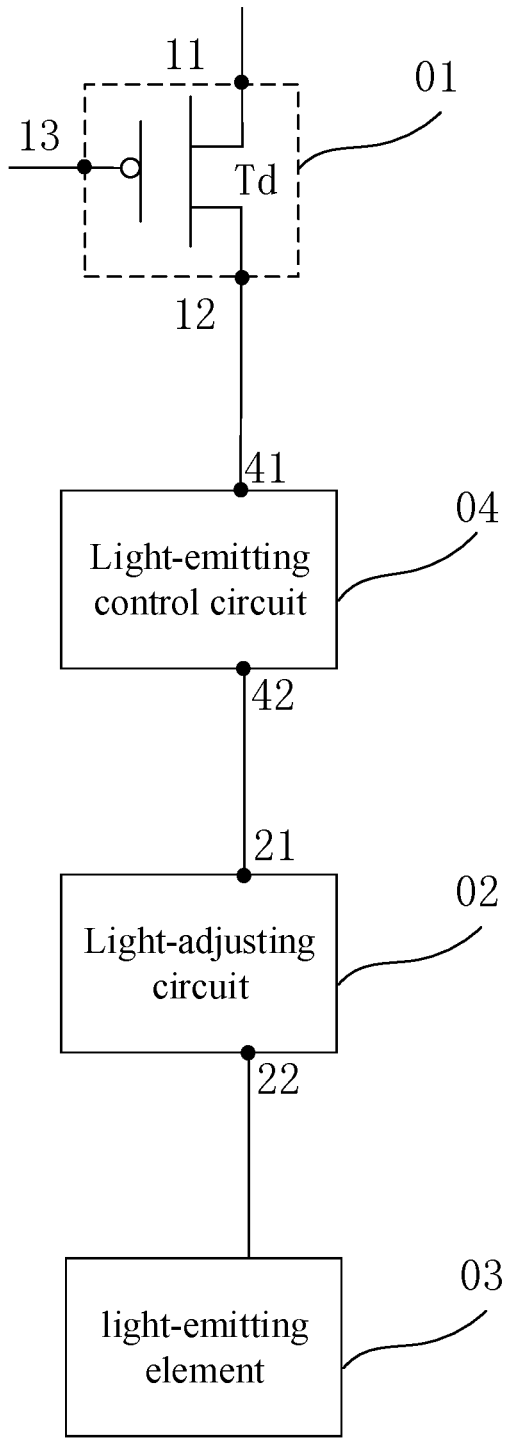
FIG. 6 is a schematic diagram illustrating a portion of another pixel driving circuit according to some embodiments of the present disclosure.
Figure 7:
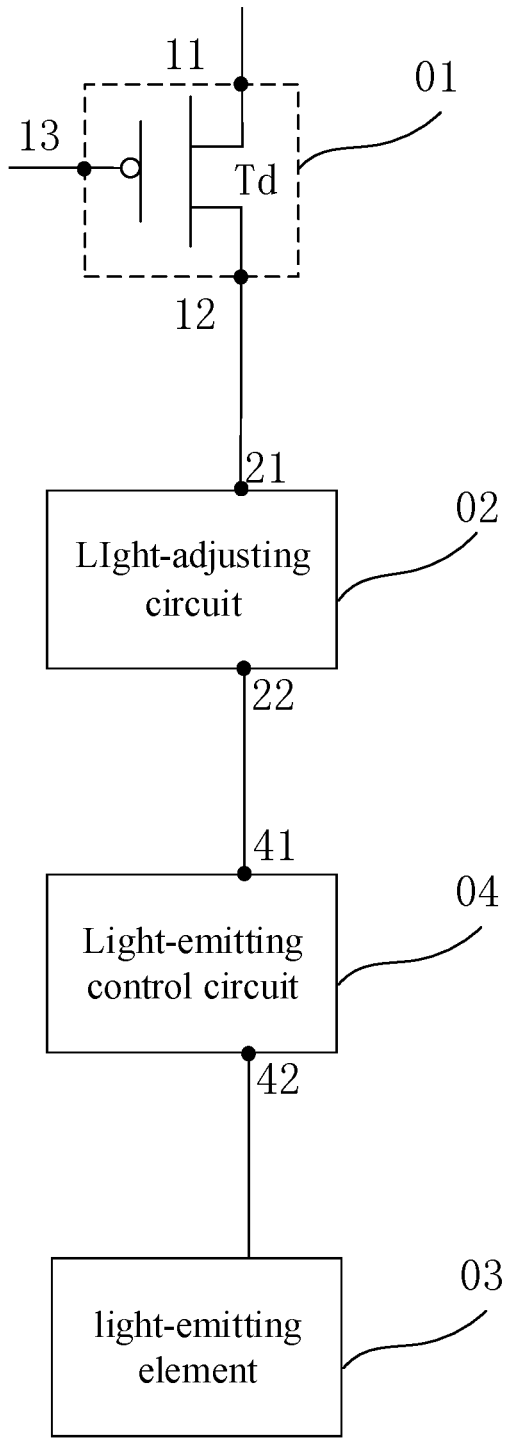
FIG. 7 is a schematic diagram illustrating a portion of another pixel driving circuit according to some embodiments of the present disclosure.

FIG. 6 is a schematic diagram illustrating a portion of another pixel driving circuit according to some embodiments of the present disclosure. FIG. 7 is a schematic diagram illustrating a portion of another pixel driving circuit according to some embodiments of the present disclosure.

In some embodiments of the present disclosure, the pixel driving circuit 001 includes a light-emitting control circuit 04 arranged between the driving circuit 01 and the light-emitting element 03, and the light-emitting control circuit 04 is configured to transmit the light-emitting current to the light-emitting element 03.

The light-emitting control circuit 04 and the light-adjusting circuit 02 are connected in series, an input terminal of one of the light-emitting control circuit 04 and the light-adjusting circuit 02 is electrically connected to an output terminal 12 of the driving circuit 01, and an output terminal of another one of the light-emitting control circuit 04 and the light-adjusting circuit 02 is electrically connected to the light-emitting element 03. For example, an input terminal of the light-emitting control circuit 04 is electrically connected to an output terminal 12 of the driving circuit 01, and an output terminal of the light-adjusting circuit 02 is electrically connected to the light-emitting element 03; or an input terminal of the light-adjusting circuit 02 is electrically connected to an output terminal 12 of the driving circuit 01, and an output terminal of the light-emitting control circuit 04 is electrically connected to the light-emitting element 03.

In some embodiments of the present disclosure, as shown in FIG. 6, the light-emitting control circuit 04 includes an input terminal 41 and an output terminal 42, and the light-adjusting circuit 02 includes an input terminal 21 and an output terminal 22. The input terminal 41 is electrically connected to the output terminal 12 of the driving circuit 01, and the output terminal 42 is electrically connected to the input terminal 21. The output terminal 22 is electrically connected to the light-emitting element 03.

In some embodiments of the present disclosure, as shown in FIG. 7, the light-adjusting circuit 02 includes an input terminal 21 and an output terminal 22, and the light-emitting control circuit 04 includes an input terminal 41 and an output terminal 42. The input terminal 21 is electrically connected to the output terminal 12 of the driving circuit 01, and the output terminal 22 is electrically connected to the input terminal 41. The output terminal 42 is electrically connected to the light-emitting element 03.

During the light-emitting stage, both the light-emitting control circuit 04 and the light-adjusting circuit 02 are turned on to ensure that the light-emitting element 03 can receive the light-emitting current, thereby generating required brightness.

In some embodiments of the present disclosure, among multiple light-emitting stages of the pixel driving circuit, the light-emitting stage where no light adjusting is performed is defined as a normal light-emitting stage. During the normal light-emitting stage, a potential of the gate of the junction field effect transistor T1 is the same as a potential of the first electrode of the junction field effect transistor T1.

It can be seen from the above analysis that whether the junction field effect transistor is an N-channel junction field effect transistor or a P-channel junction field effect transistor, when the voltage Vgs between the gate and the first electrode of the junction field effect transistor T1 is equal to 0, the width of the depletion layer M is the smallest, and the width of the conductive channel is the largest. That is, when the voltage Vgs between the gate and the first electrode of the junction field effect transistor T1 is equal to 0, a resistance of the conductive channel of the junction field effect transistor T1 is the smallest, and the loss of the light-emitting current flowing through the junction field effect transistor T1 is the smallest.

Therefore, during the normal light-emitting stage, by controlling a potential of the gate of the junction field effect transistor T1 to be equal to a potential of the first electrode of the junction field effect transistor T1, the loss of the light-emitting current can be reduced, thereby reducing the power consumption of the display panel.

Figure 8:
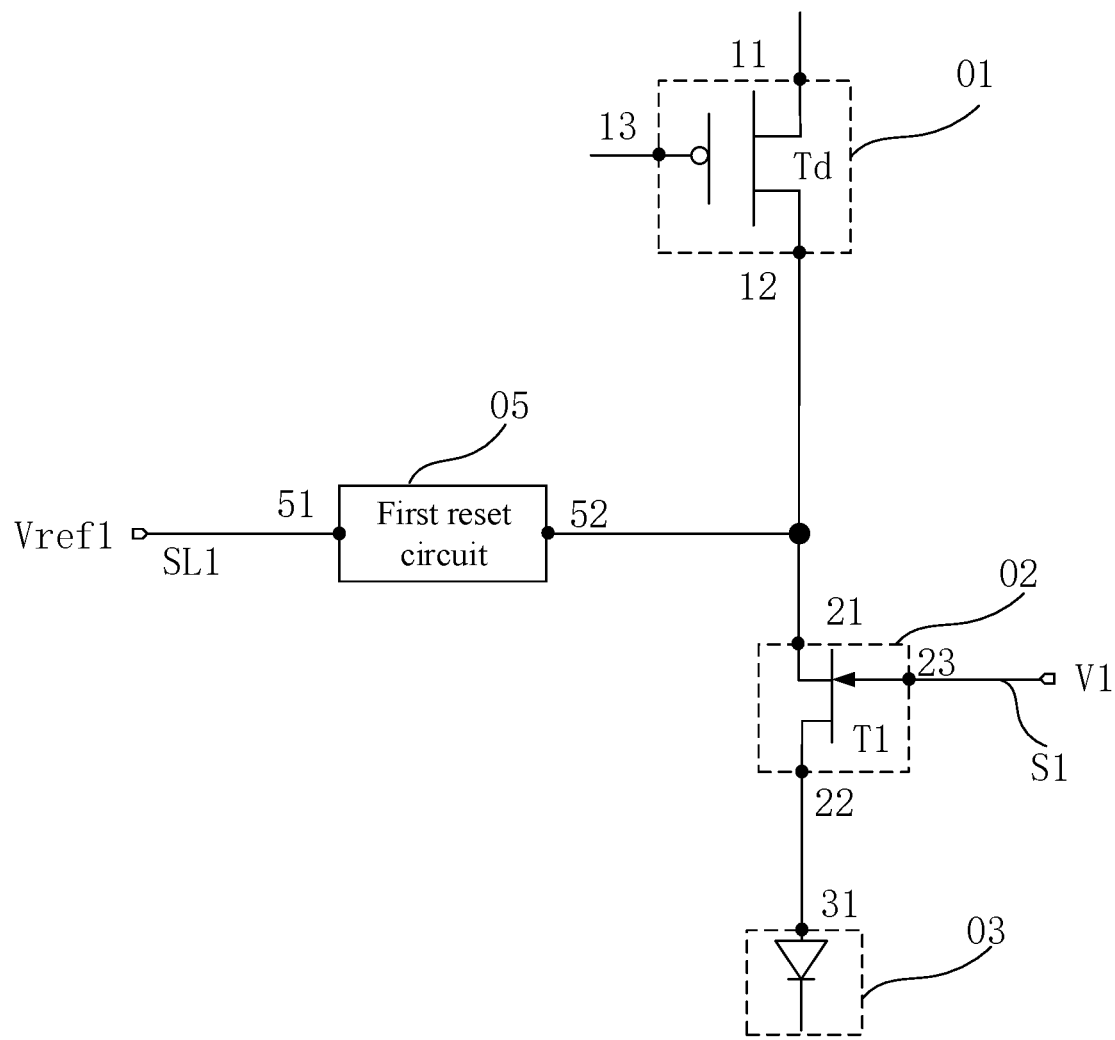
FIG. 8 is a schematic diagram illustrating a portion of another pixel driving circuit according to some embodiments of the present disclosure.
Figure 9:
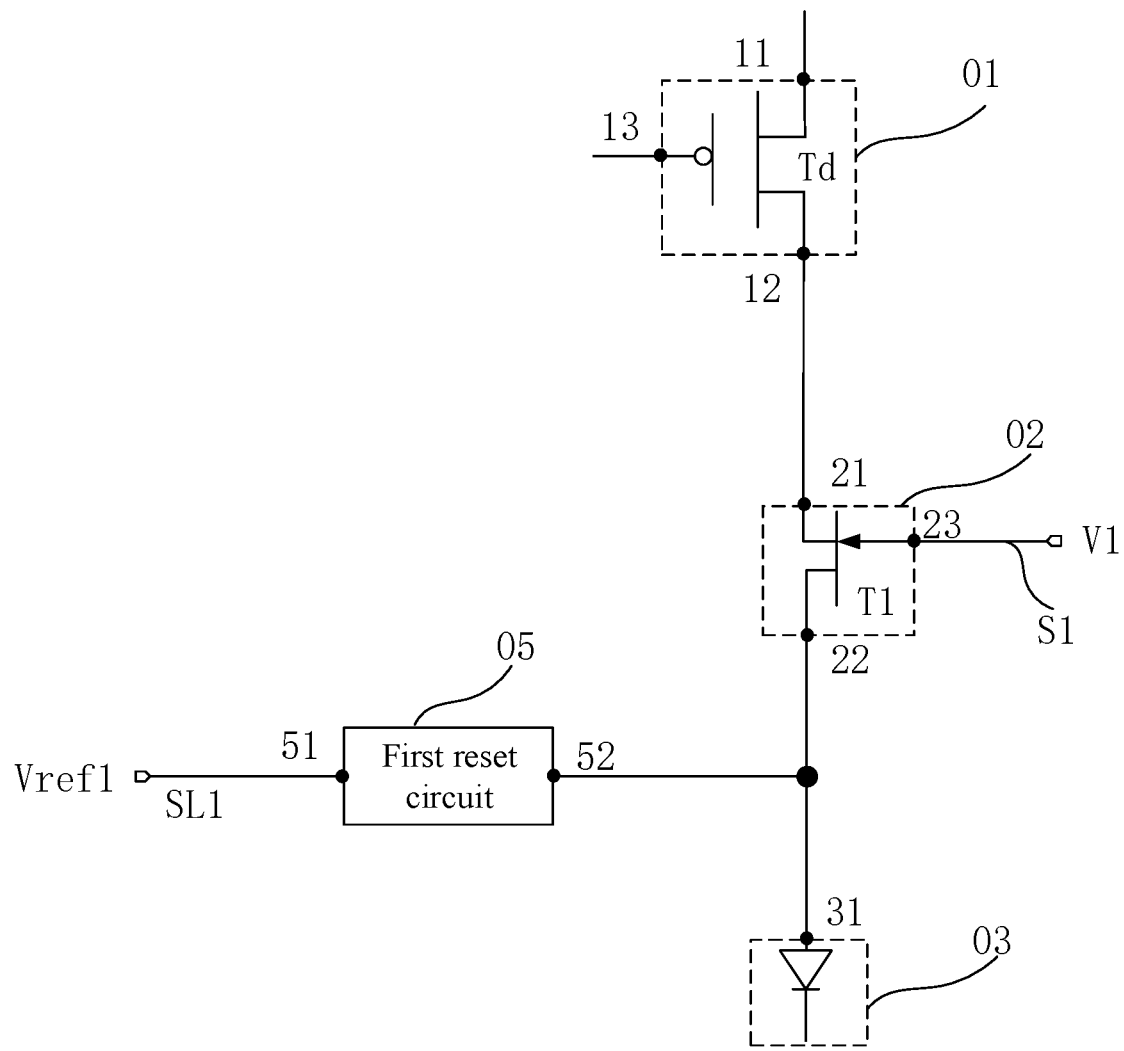
FIG. 9 is a schematic diagram illustrating a portion of another pixel driving circuit according to some embodiments of the present disclosure.

FIG. 8 is a schematic diagram illustrating a portion of another pixel driving circuit according to some embodiments of the present disclosure. FIG. 9 is a schematic diagram illustrating a portion of another pixel driving circuit according to some embodiments of the present disclosure.

In some embodiments of the present disclosure, as shown in FIG. 8 and FIG. 9, the pixel driving circuit 001 includes a first reset circuit 05 configured to reset the light-emitting element 03.

In some embodiments of the present disclosure, as shown in FIG. 8, the first reset circuit 05 includes an input terminal 51 electrically connected to a first reset signal line SL1, an output terminal 52 electrically connected to the input terminal 21 of the light-adjusting circuit 02, and the output terminal 22 of the light-adjusting circuit 02 is electrically connected to a first electrode 31 of the light-emitting element 03.

When the first reset circuit 05 is turned on, the light-adjusting circuit 02 is also turned on, a first reset voltage Vref1 transmitted by the first reset signal line SL1 is transmitted to the first electrode 31 of the light-emitting element 03 through the turned-on first reset circuit 05 and the turned-on light-adjusting circuit 02, thereby achieving reset of the light-emitting element 03. The light-emitting element 03 can be an organic light-emitting diode, and the first electrode 31 of the light-emitting element 03 can be an anode.

In some embodiments of the present disclosure, when the first reset circuit 05 is turned on, a potential of the control terminal 23 of the light-adjusting circuit 02 is the same as a potential of the output terminal 52 of the first reset circuit 05. That is, the potential of the control terminal 23 of the light-adjusting circuit 02 is the same as a potential of the input terminal 21 of the light-adjusting circuit 02.

In the embodiments described above, the light-adjusting circuit 02 includes a junction field effect transistor T1, when a potential of the control terminal 23 of the light-adjusting circuit 02 is the same as a potential of the input terminal 21 of the light-adjusting circuit 02, that is, when a voltage Vgs between the gate of the junction field effect transistor T1 and the first electrode of the junction field effect transistor T1 is equal to 0, a width of the conductive channel of the junction field effect transistor T1 is the largest, and a resistance of the conductive channel is the smallest. In this way, it is as much as possible to ensure that the light-emitting element 03 is reset by the potential transmitted by the first reset circuit 05, thereby ensuring the reset effect of the light-emitting element 03.

In some embodiments of the present disclosure, as shown in FIG. 9, the first reset circuit 05 includes an input terminal 51 electrically connected to the first reset signal line SL1, and an output terminal 52 electrically connected to the output terminal 22 of the light-adjusting circuit 02. The output terminal 52 of the first reset circuit 05 is electrically connected to the first electrode 31 of the light-emitting element 03.

When the first reset circuit 05 is turned on, a first reset voltage Vref1 transmitted by the first reset signal line SL1 is transmitted to the first electrode 31 of the light-emitting element 03 through the turned-on first reset circuit 05, thereby resetting the light-emitting element 03.

In the embodiments of the present disclosure, during the reset stage of the light-emitting element 03, an effect of the light-adjusting circuit 02 on reset of the light-emitting element 03 is avoided, thereby being beneficial to ensure the reset effect of the light-emitting element 03. During the reset stage of the light-emitting element 03, there is no need to taking a turned-on/turned-off state of the light-adjusting circuit 02 into account. At this time, the light-adjusting signal line S1 can stop transmitting the light-adjusting voltage V1, thereby beneficially reducing the power consumption of the display panel.

Figure 10:
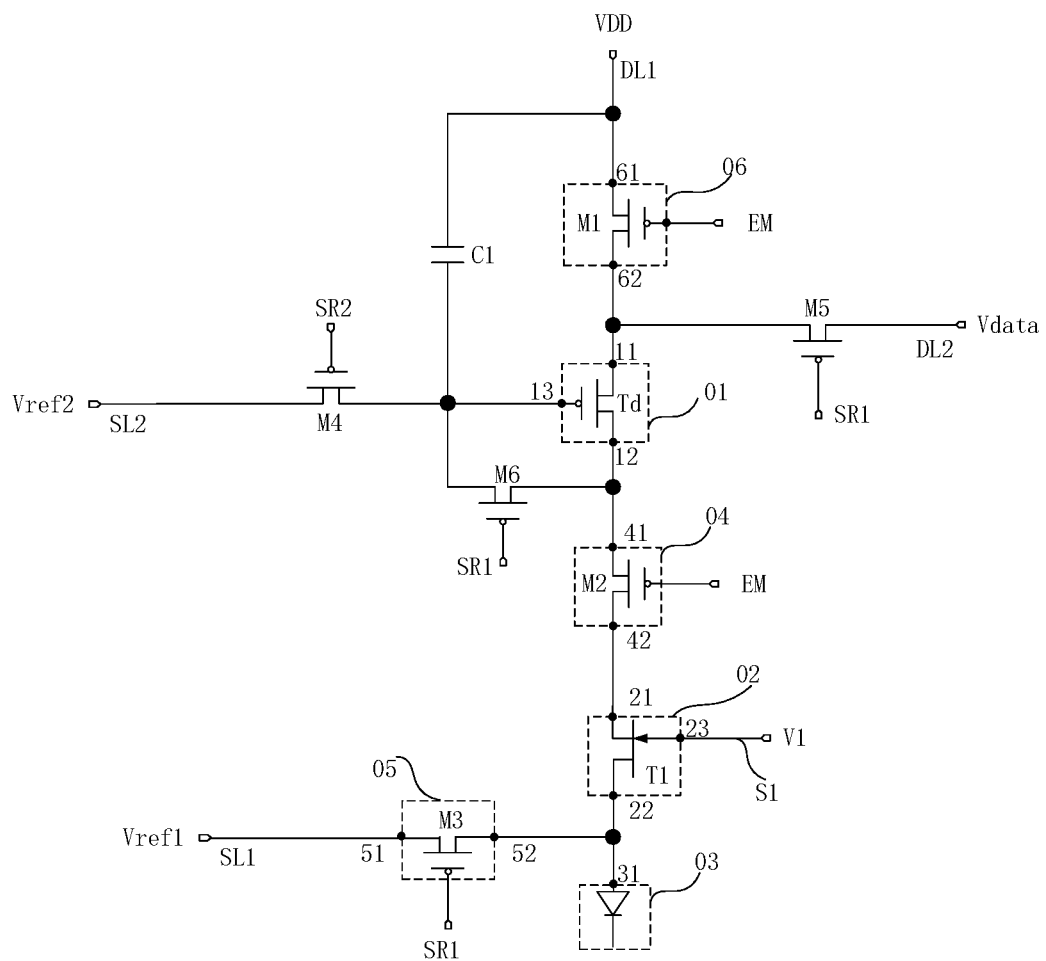
FIG. 10 is a schematic diagram illustrating a pixel driving circuit according to some embodiments of the present disclosure.

FIG. 10 is a schematic diagram illustrating a pixel driving circuit according to some embodiments of the present disclosure.

As shown in FIG. 10, in some embodiments of the present disclosure, the pixel driving circuit 001 include a power voltage writing circuit 06 electrically connected to the input terminal 11 of the driving circuit 01, and the power voltage writing circuit 06 is configured to transmit a power voltage Vdata to the input terminal 11 of the driving circuit 01.

The power voltage writing circuit 06 includes an input terminal 61 electrically connected to a power voltage signal line DL1. During the light-emitting stage, the power voltage writing circuit 06 is turned on, and the power voltage Vdata transmitted by the power voltage signal line DL1 is transmitted to the input terminal 11 of the driving circuit 01 through the turned-on power voltage writing circuit 06.

With continued reference to FIG. 10, the power voltage writing circuit 06 includes a first transistor M1, and the first transistor M1 includes a source electrically connected to the power voltage signal line DL1, a drain electrically connected to a source of the driving transistor Td, and a gate electrically connected to a light-emitting control signal line EM. The light-emitting control circuit 04 includes a second transistor M2, and the second transistor M2 includes a source electrically connected to a drain of the driving transistor Td, a drain electrically connected to the first electrode of the junction field effect transistor T1, and a gate electrically connected to the light-emitting control signal line EM. The first reset circuit 05 includes a third transistor M3, and the third transistor M3 includes a source electrically connected to the first reset signal line SL1, a drain electrically connected to the first electrode 31 of the light-emitting element 03, and a gate electrically connected to a first scanning line SR1.

In some embodiments, the pixel driving circuit 001 includes a fourth transistor M4, a fifth transistor M5, a sixth transistor M6, and a first capacitor C1. In some embodiments of the present disclosure, the fourth transistor M4 includes a source electrically connected to a second reset signal line SL2, a drain electrically connected to the gate of the driving transistor Td, and a gate electrically connected to a second scanning line SR2. The fifth transistor M5 includes a source electrically connected to a data signal line DL2, a drain electrically connected to the source of the driving transistor Td, and a gate electrically connected to the first scanning line SR1. The sixth transistor M6 includes a source electrically connected to the drain of the driving transistor Td, a drain electrically connected to the gate of the driving transistor Td, and a gate electrically connected to the second scanning line SR2. The first capacitor C1 includes a first electrode electrically connected to the power voltage signal line DL1, and a second electrode electrically connected to the gate of the driving transistor Td.

Figure 11:
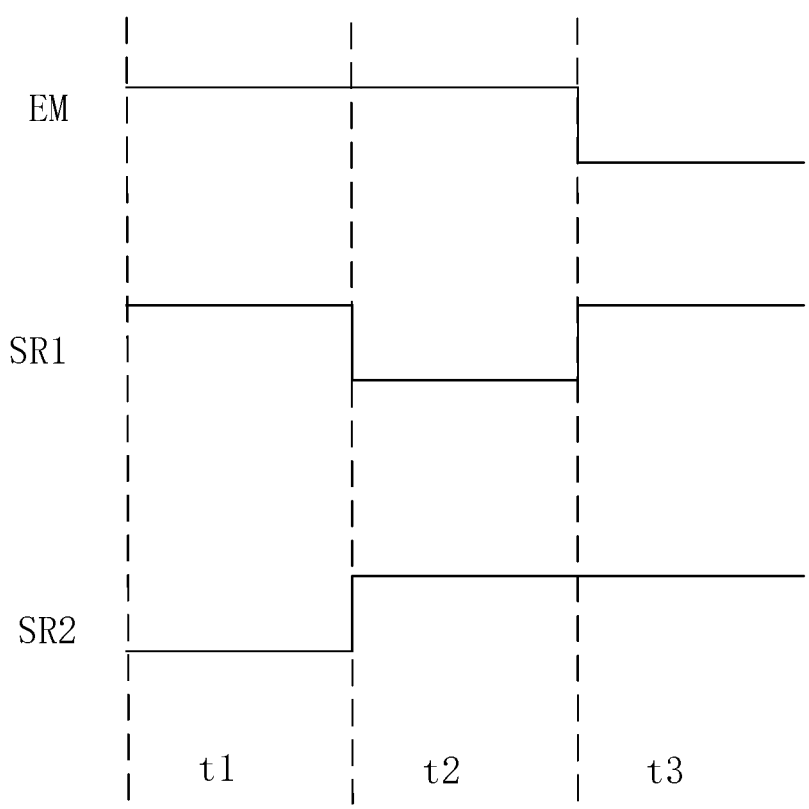
FIG. 11 is schematic diagram illustrating a timing sequence of the pixel driving circuit shown in FIG. 10 according to some embodiments of the present disclosure.

FIG. 11 is schematic diagram illustrating a timing sequence of the pixel driving circuit shown in FIG. 10.

A working process of the pixel driving circuit shown in FIG. 10 will be described below with reference to FIG. 10 and FIG. 11.

In the following embodiments, the first transistor M1, the second transistor M2, the third transistor M3, the fourth transistor M4, the fifth transistor M5, and the sixth transistor M6 are P-type transistors. Any one of the above-mentioned transistors can also be an N-type transistor.

As shown in FIG. 11, a working cycle of the pixel driving circuit shown in FIG. 10 includes a reset stage t1, a data voltage writing stage t2 and a light-emitting stage t3.

During the reset stage t1, the second scanning line SR2 transmits a turn-on signal (i.e., a low-level signal), and the fourth transistor M4 is turned on; the first scanning line SR1 transmits a turn-off signal (i.e., a high-level signal), and the third transistor M3, the fifth transistor M5, and the sixth transistor M6 are turned off; and the light-emitting control signal line EM transmits a turn-off signal (i.e., a high-level signal), and the first transistor M1 and the second transistor M2 are turned off. At the same time, the second reset signal line SL2 transmits a second reset voltage Vref2, and the second reset voltage Vref2 is transmitted to the gate of the driving transistor Td through the turned-on fourth transistor M4, thereby resetting the driving transistor Td. Since the gate of the driving transistor Td is connected to the first capacitor C1, the second reset voltage Vref2 can be stored in the gate of the driving transistor Td.

During the data voltage writing stage t2, the first scanning line SR1 transmits a turn-on signal (i.e., a low-level signal), and the third transistor M3, the fifth transistor M5, and the sixth transistor M6 are turned on; the second scanning line SR2 transmits a turn-off signal (i.e., a high-level signal), and the fourth transistor M4 is turned off and the light-emitting control signal line EM transmits a turn-off signal (i.e., a high-level signal), and the first transistor M1 and the second transistor M2 are turned off. At the same time, the data signal line DL2 transmits a data voltage Vdata, and the data voltage Vdata is transmitted to the source of the driving transistor Td through the turned-on fifth transistor M5.

During an initial stage of the data voltage writing stage t2, a potential of the source of the driving transistor Td is the data voltage Vdata, and a potential of the gate of the driving transistor Td is the second reset voltage Vref2. Therefore, a difference between a potential of the source and a potential of the gate of the driving transistor Td is equal to (Vdata−Vref2), which is greater than 0. Therefore, the driving transistor Td is turned on, and the data voltage Vdata is transmitted to the gate of the driving transistor Td through the turned-on driving transistor Td and the turned-on sixth transistor M6, such that a potential of the gate of the driving transistor Td gradually increases. When the potential of the gate of the driving transistor Td is equal to (Vdata−|Vth|), the driving transistor Td is turned off. At this time, with the first capacitor C1, the potential of the gate of the driving transistor Td remains at (Vdata−|Vth|) during the data voltage writing stage t2, where Vth denotes a threshold voltage of the driving transistor Td.

At the same time, the first reset signal line SL1 transmits the first reset voltage Vref1, and the first reset voltage Vref1 can be transmitted to the first electrode 31 of the light-emitting element 03 through the turned-on third transistor M3, thereby resetting the light-emitting element 03.

During the reset stage t1 and in the data voltage writing stage t2, a turned-on/turned-off state of the light-adjusting circuit 02 is not limited. In some embodiments of the present disclosure, the light-adjusting signal line S1 does not need to transmit a signal, thereby being beneficial to reduce the power consumption of the display panel.

In some embodiments of the present disclosure, the first reset signal line SL1 can be reused as the second reset signal line SL2, and the first reset voltage Vref1 and the second reset voltage Vref2 can be a same voltage.

During the light-emitting stage t3, each of the first scanning line SR1 and the second scanning line SR2 transmits a turn-off signal (i.e., a high-level signal), and the third transistor M3, the fourth transistor M4, the fifth transistor M5, and the sixth transistor M6 are turned off; and the light-emitting control signal line EM transmits a turn-on signal (i.e., a low-level signal), and the first transistor M1 and the second transistor M2 are turned on. At the same time, the power voltage signal line DL1 transmits a power voltage VDD, and the power voltage VDD is transmitted to the source of the driving transistor Td through the turned-on first transistor M1, that is, a potential of the source of the driving transistor Td is VDD. Since a potential of the power voltage VDD is greater than a potential of the data voltage Vdata, the driving transistor Td generates the light-emitting current and transmits the light-emitting current to the light-emitting element 03 through the second transistor M2 and the junction field effect transistor T1, thereby controlling the light-emitting element 03 to emit light.

During the light-adjusting stage, that is, during the light-emitting stage t3 during which light adjusting is performed, the light-adjusting signal line S1 transmits a light-adjusting voltage V1 to the gate of the junction field effect transistor T1. By controlling a value of the voltage Vgs between the gate and the first electrode of the junction field effect transistor T1, a resistance of the conductive channel of the junction field effect transistor T1 can be adjusted, thereby adjusting a light-emitting current flowing through the junction field effect transistor T1. That is, by adjusting a value of the light-emitting current generated by the driving transistor Td transmitted to the light-emitting element 03, the brightness of the light-emitting element 03 is adjusted.

The light-adjusting voltage V1 can be determined according to an adjustment degree of the light-emitting brightness of the light-emitting element 03, thereby adjusting the value of the light-emitting current transmitted to the light-emitting element 03.

During the normal light-emitting stage, that is, during the light-emitting stage t3 during which light adjusting is not performed, the light-adjusting signal line S1 transmits a light-adjusting voltage V1 to the gate of the junction field effect transistor T1, to control the junction field effect transistor T1 to be turned on.

In some embodiments, during the normal light-emitting stage, a potential of the light-adjusting voltage V1 is the same as a potential of the first electrode of the junction field effect transistor T1, to ensure that the light-emitting current generated by the driving transistor Td is transmitted as much as possible to the light-emitting element 03. In this way, the light-emitting element 03 can generate brightness corresponding to the light-emitting current generated by the driving transistor Td. During the normal light-emitting stage, the potential of the light-adjusting voltage V1 can be approximately the same as a potential of the power voltage VDD.

Figure 12:
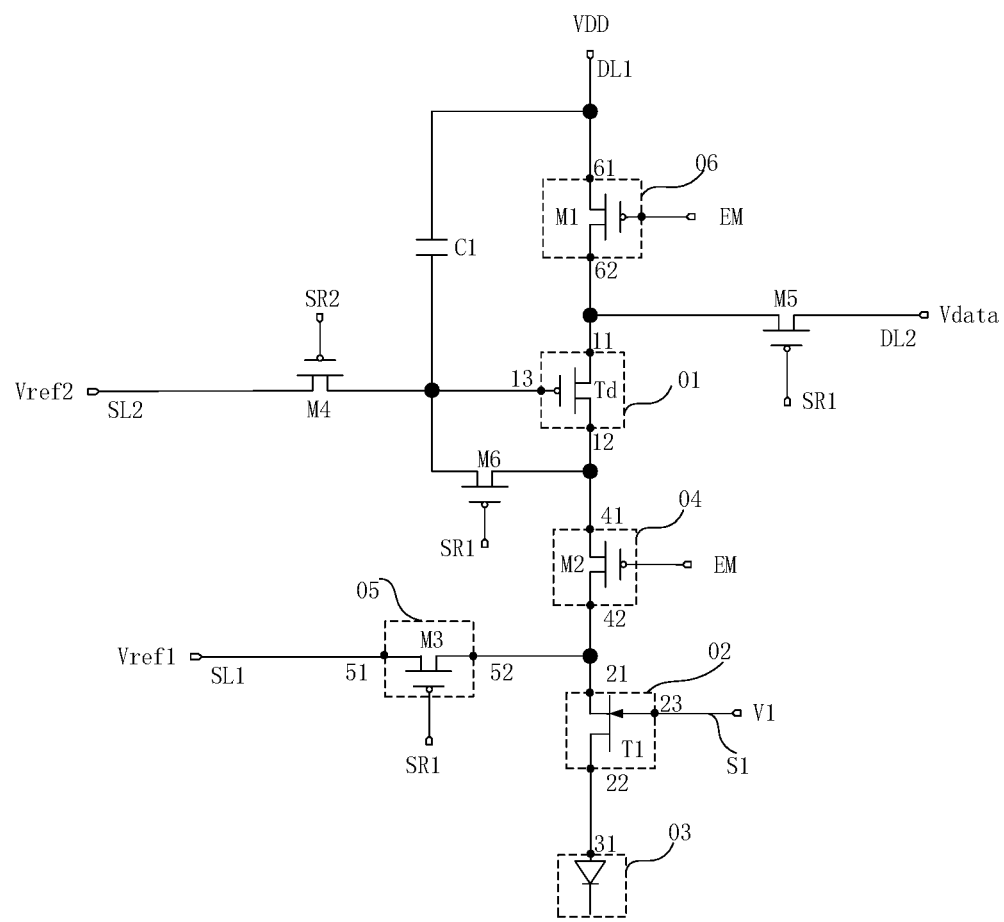
FIG. 12 is a schematic diagram illustrating another pixel driving circuit according to some embodiments of the present disclosure.

FIG. 12 is a schematic diagram illustrating another pixel driving circuit according to some embodiments of the present disclosure.

A structure of the pixel driving circuit 001 shown in FIG. 12 differs from a structure of the pixel driving circuit 001 shown in FIG. 10 only in that the junction field effect transistor T1 is electrically connected between the output terminal 52 of the first reset circuit 05 and the light-emitting element 03.

For the pixel driving circuit 001 shown in FIG. 12, during the stage during which the first reset circuit 05 is turned on, for example, during the data writing stage t2, the junction field effect transistor T1 can be turned on. In this way, it can ensure that the first reset voltage Vref1 can be transmitted to the first electrode 31 of the light-emitting element 03 through the turned-on first reset circuit 05 and the turned-on junction field effect transistor T1, thereby resetting the light-emitting element 03.

In some embodiments of the present disclosure, during a stage during which the first reset circuit 05 is turned on, the light-adjusting voltage V1 transmitted by the light-adjusting signal line S1 to the gate of the junction field effect transistor T1 is the same as a potential of the first electrode of the junction field effect transistor T1. In this way, a width of the conductive channel of the junction field effect transistor T1 is the largest, and a resistance of the conductive channel of the junction field effect transistor T1 is the smallest. In this way, it is as much as possible to ensure that the light-emitting element 03 is reset by the first reset voltage Vref1, thereby ensuring the reset effect of the light-emitting element 03.

Some embodiments of the present disclosure provide a method for driving a pixel driving circuit. A structure of the pixel driving circuit 001 can refer to the schematic diagrams in the above-mentioned as shown in FIGS. 1, 2, 4, 6-10, and 12. The method can be understood in combination with a working process of the pixel driving circuit 001 in the above embodiments.

For the pixel driving circuit 001, the control terminal 23 of the light-adjusting circuit 02 is electrically connected to the light-adjusting signal line S1.

FIG. 13 is a flowchart of a method for driving a pixel driving circuit according to some embodiments of the present disclosure.

As shown in FIG. 13, the method includes followings step B1.

At step B1, during the light-adjusting stage, the light-adjusting signal line S1 transmits a light-adjusting voltage V1, and the light-adjusting circuit 02 adjusts a value of the light-emitting current under the light-adjusting voltage V1.

That is, at step B1, the light-adjusting circuit 02 adjusts, under the light-adjusting voltage V1, the value of the light-emitting current generated by the driving circuit 01 and transmitted to the light-emitting element 03, thereby achieving brightness adjustment of the light-emitting element 03.

According to the method provided by the embodiments of the present disclosure, the light-adjusting circuit 02 is connected in series between the driving circuit 01 and the light-emitting element 03, and the light-adjusting circuit 02 adjusts the value of the light-emitting current generated by the driving circuit 01 and transmitted to the light-emitting element 03, thereby achieving brightness adjustment of the light-emitting element 03. According to the method provided by the embodiments of the present disclosure, there is no need to achieve brightness adjustment of the light-emitting element 03 by controlling the value of the light-emitting current generated by the driving circuit 01 itself, thereby being beneficial to avoid a problem that the driving transistor Td is affected by fluctuation of the sub-threshold swing when the driving transistor Td in the driving circuit 01 generates a small light-emitting current to achieve low light-emitting brightness of the light-emitting element 03. Therefore, the method provided by the embodiments of the present disclosure can provide a stable and ideal light-emitting current for the light-emitting element 03, such that the light-emitting brightness of the light-emitting element 03 is basically the same as the preset value.

In some embodiments of the present disclosure, as shown in FIG. 2, the light-adjusting circuit 02 includes a junction field effect transistor T1. The junction field effect transistor T1 includes a first electrode electrically connected to an input terminal 21 of the light-adjusting circuit 02, a second electrode electrically connected to an output terminal 22 of the light-adjusting circuit 02, and a gate electrically connected to a control terminal 23 of the light-adjusting circuit 02. The junction field effect transistor T1 is an N-channel junction field effect transistor.

At step B1, transmitting the light-adjusting voltage V1 by the light-adjusting signal line S1 includes during the light-adjusting stage, setting the light-adjusting voltage transmitted by the light-adjusting signal line S1 to be smaller than a voltage received by the first electrode of the junction field effect transistor T1.

It is known from the working principle of the N-channel junction field effect transistor in the above embodiments that during the light-adjusting stage, by controlling that a voltage between the gate of the junction field effect transistor T1 and the first electrode of the junction field effect transistor T1 is smaller than 0, that is, by controlling that the light-adjusting voltage V1 transmitted by the light-adjusting signal line is smaller than the voltage received by the first electrode of the junction field effect transistor T1, the resistance of the conductive channel of the junction field effect transistor T1 can be adjusted, thereby achieving adjustment of the light-emitting current flowing through the junction field effect transistor T1. That is, the value of the light-emitting current generated by the driving circuit 01 and transmitted to the light-emitting element 03 is adjusted, thereby achieving brightness adjustment of the light-emitting element 03.

To ensure that the light-emitting element 03 emits light during the light-adjusting stage, the voltage Vgs between the gate and the first electrode of the junction field effect transistor T1 can be greater than the pinch-off voltage.

In some embodiments of the present disclosure, as shown in FIG. 4, the light-adjusting circuit 02 includes a junction field effect transistor T1. The junction field effect transistor T1 includes a first electrode electrically connected to an input terminal 21 of the light-adjusting circuit 02, a second electrode electrically connected to an output terminal 22 of the light-adjusting circuit 02, and a gate electrically connected to a control terminal 23 of the light-adjusting circuit 02. The junction field effect transistor T1 is a P-channel junction field effect transistor.

At step B1, transmitting the light-adjusting voltage V1 by the light-adjusting signal line S1 includes during the light-adjusting stage, setting the light-adjusting voltage transmitted by the light-adjusting signal line S1 to be greater than a voltage received by the first electrode of the junction field effect transistor T1.

It is known from the working principle of the P-channel junction field effect transistor in the above embodiments that in the light-adjusting stage, by controlling that a voltage between the gate of the junction field effect transistor T1 and the first electrode of the junction field effect transistor T1 is larger than 0, that is, by controlling that the light-adjusting voltage V1 transmitted by the light-adjusting signal line is larger than the voltage received by the first electrode of the junction field effect transistor T1, the resistance of the conductive channel of the junction field effect transistor T1 can be adjusted, thereby achieving adjustment of the light-emitting current flowing through the junction field effect transistor T1. That is, the value of the light-emitting current generated by the driving circuit 01 and transmitted to the light-emitting element 03 is adjusted, thereby achieving brightness adjustment of the light-emitting element 03.

To ensure that the light-emitting element 03 emits light during the light-adjusting stage, the voltage Vgs between the gate and the first electrode of the junction field effect transistor T1 can be smaller than the pinch-off voltage.

FIG. 14 is a flowchart of another method for driving a pixel driving circuit according to some embodiments of the present disclosure.

As shown in FIG. 14, in some embodiments of the present disclosure, the method includes following step B2.

At step B2, during the normal light-emitting stage, the light-adjusting signal line S1 transmits a light-adjusting voltage V1, a potential of which is the same as a potential of the input terminal 21 of the light-adjusting circuit 02.

The normal light-emitting stage is one light-emitting stage among multiple light-emitting stages of the pixel driving circuit 001, and the one light-emitting stage is a phase during which no light adjusting is performed.

When a potential of the gate of the junction field effect transistor T1 is equal to a potential of the first electrode of the junction field effect transistor T1, a resistance of the conductive channel of the junction field effect transistor T1 is the smallest, and the loss of the light-emitting current flowing through the junction field effect transistor T1 is the smallest.

Therefore, during the normal light-emitting stage, by controlling a potential of the gate of the junction field effect transistor T1 to be equal to a potential of the first electrode of the junction field effect transistor T1. That is, by controlling the light-adjusting signal line S1 to transmit a light-adjusting voltage V1 that has the same potential as the input terminal 21 of the light-adjusting circuit 02, the loss of the light-emitting current can be reduced, thereby reducing the power consumption of the display panel.

A sequence for performing step B1 and step B2 is not limited herein, and step B1 and step B2 can be steps performed in different light-emitting stages of the pixel driving circuit 001.

In some embodiments of the present disclosure, as shown in FIG. 8, the pixel driving circuit 001 includes a first reset circuit 05, an output terminal 52 of the first reset circuit 05 is electrically connected to the input terminal 21 of the light-adjusting circuit 02, the output terminal 22 of the light-adjusting circuit 02 is electrically connected to the first electrode 31 of the light-emitting element 03, and the first reset circuit 05 is configured to reset the light-emitting element 03.

The method for driving the pixel driving circuit can include the following step. When the first reset circuit 05 is turned on, controlling the light-adjusting circuit 02 to be turned on by the light-adjusting voltage V1 transmitted by the light-adjusting signal line S1.

In some embodiments of the present disclosure, when the first reset circuit 05 is turned on, the light-adjusting circuit 02 is controlled to be turned on, to ensure that the first reset voltage Vref1 output from the first reset circuit 05 can be transmitted to the light-emitting element 03 through the turned-on light-adjusting circuit 02, thereby resetting the light-emitting element 03.

In some embodiments of the present disclosure, controlling the light-adjusting circuit 02 to be turned on by the light-adjusting voltage V1 transmitted by the light-adjusting signal line S1 when the first reset circuit 05 is turned on, includes setting a potential of the light-adjusting voltage V1 transmitted by the light-adjusting signal line S1 to be the same as a potential of the output terminal 52 of the first reset circuit 05 when the first reset circuit 05 is turned on.

That is, when the first reset circuit 05 is turned on, it is controlled that the potential of the control terminal 23 of the light-adjusting circuit 02 is the same as the potential of the input terminal 21 of the light-adjusting circuit 02.

When the potential of the control terminal 23 of the light-adjusting circuit 02 is the same as the potential of its input terminal 21, that is, when the voltage between Vgs the gate and the first electrode of the junction field effect transistor T1 is equal to 0, a width of the conductive channel of the junction field effect transistor T1 is the largest, and the resistance of the conductive channel is the smallest. In this way, it is as much as possible to ensure that the light-emitting element 03 is reset by the potential transmitted by the first reset circuit 05, thereby ensuring the reset effect of the light-emitting element 03.

Figure 15:
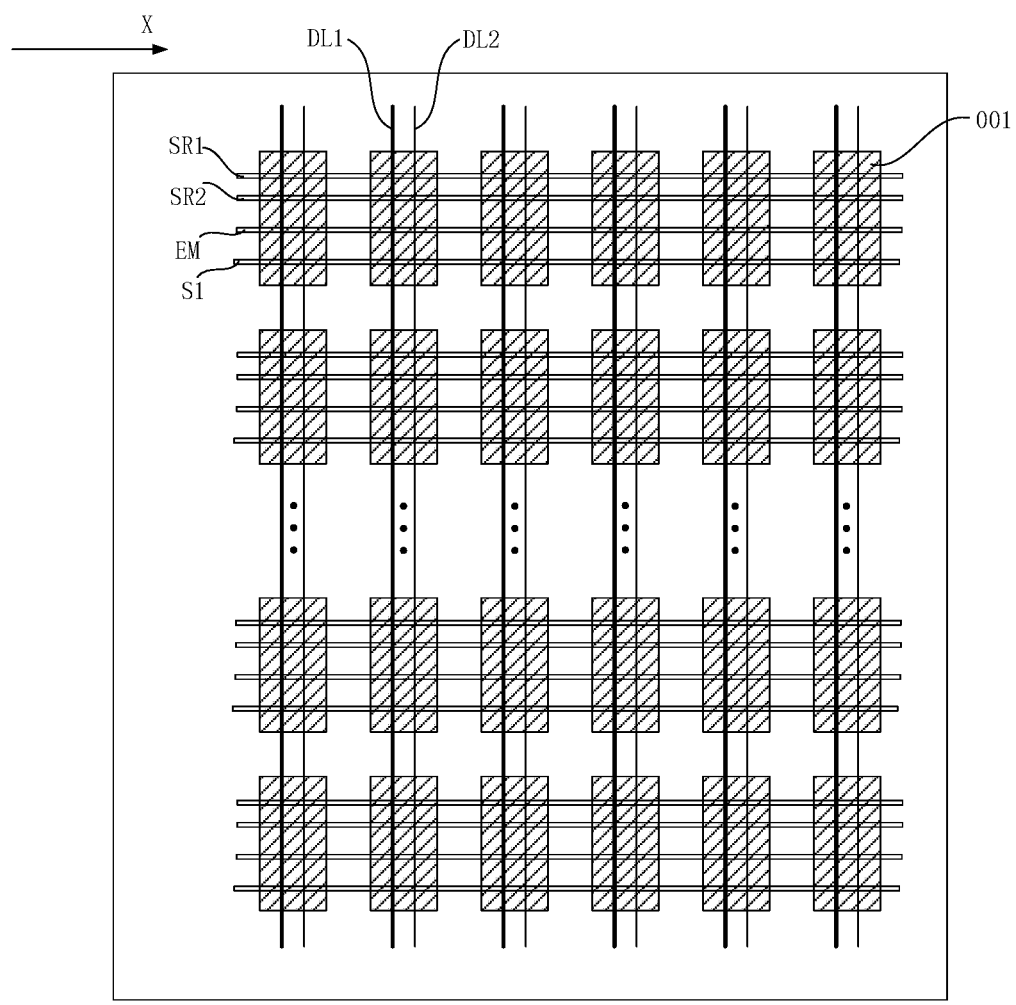
FIG. 15 is a schematic diagram of a display panel according to some embodiments of the present disclosure.

FIG. 15 is a schematic diagram of a display panel according to some embodiments of the present disclosure.

The embodiments of the present disclosure provide a display panel 100. As shown in FIG. 15, the display panel 100 includes the pixel driving circuit 001 provided in the above-mentioned embodiments. The display panel 100 can include multiple pixel driving circuits 001 arranged in an array.

In some embodiments of the present disclosure, with reference to FIG. 14, the light-adjusting signal line S1 extends along a first direction X, and at least two of the pixel driving circuits 001 arranged along the first direction X can be electrically connected to a same light-adjusting signal line S1.

In some embodiments of the present disclosure, the first direction X is a row direction of the display panel 100, and some pixel driving circuits 001 arranged along the row direction are electrically connected to a same light-adjusting signal line S1.

It can be understood that some pixel driving circuits 001 arranged in a same row can share a scanning line, that is, the working states of these pixel driving circuits 001 arranged in a same row can be the same.

In some embodiments of the present disclosure, brightness of the light-emitting elements 03 in the pixel driving circuits 001 arranged in a row direction can be simultaneously adjusted, and it is beneficial to reduce the number of light-adjusting signal lines S1 of the display panel 100, thereby reducing the difficulty in terms of designing a peripheral drive circuit of the display panel 100.

For the display panel 100, a light-adjusting circuit 02 is connected in series between the driving circuit 01 and the light-emitting element 03, to adjust the value of the light-emitting current generated by the driving circuit 01 and transmitted to the light-emitting element 03, thereby achieving brightness adjustment of the light-emitting element 03. For the display panel 100 provided by the embodiments of the present disclosure, it is not necessary to adjust the brightness of the light-emitting element 03 by controlling a value of the light-emitting current generated by the driving circuit 01 itself. Therefore, when the driving transistor Td in the driving circuit 01 generates a small light-emitting current to achieve low light-emitting brightness of the light-emitting element 03, a problem that the driving transistor Td is affected by fluctuation of the sub-threshold swing can be avoided. Therefore, the display panel 100 provided by the embodiments of the present disclosure can provide a stable and ideal light-emitting current for the light-emitting element 03, so that the light-emitting brightness of the light-emitting element 03 is basically consistent with the preset value.

Figure 16:
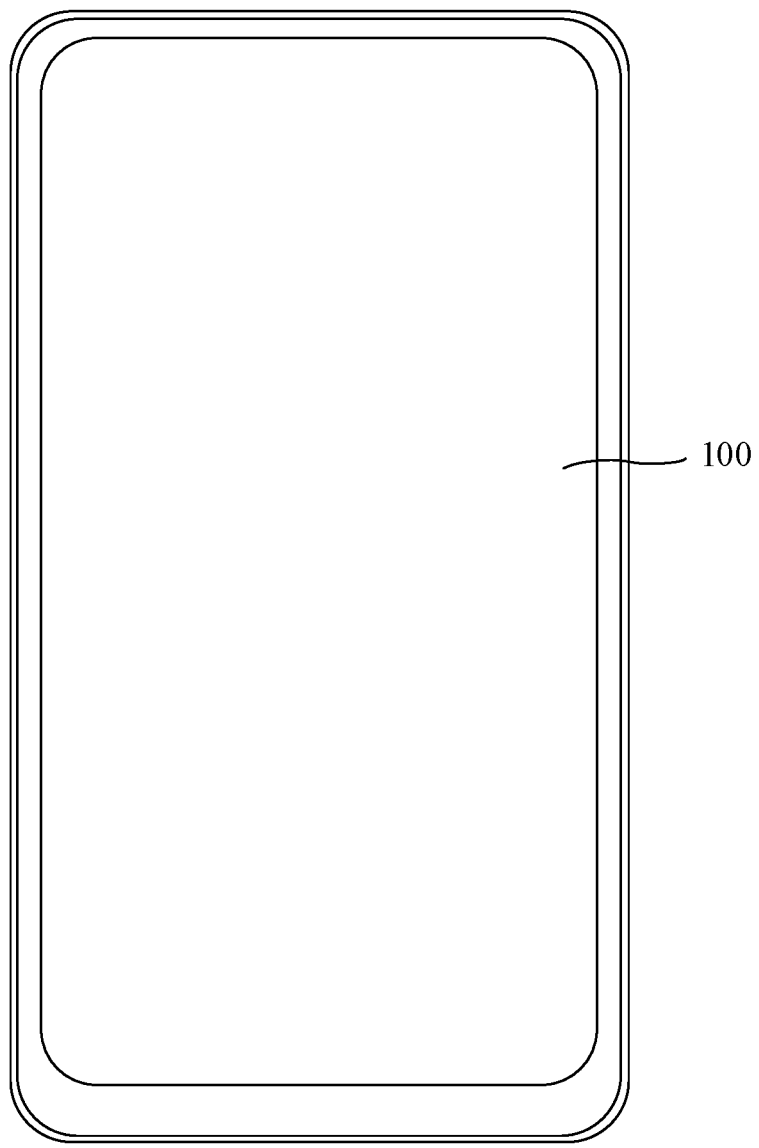
FIG. 16 is a schematic diagram of a display device according to some embodiments of the present disclosure.

FIG. 16 is a schematic diagram of a display device according to some embodiments of the present disclosure.

Some embodiments of the present disclosure provide a display device 200. As shown in FIG. 16, the display device 200 includes the display panel 100 provided in the above embodiments. The display device 200 provided by some embodiments of the present disclosure can be a mobile phone. The display device 200 provided by other embodiments of the present disclosure can also be a computer, a television, etc.

For the display device 200, a light-adjusting circuit 02 is connected in series between the driving circuit 01 and the light-emitting element 03, to adjust the value of the light-emitting current generated by the driving circuit 01 and transmitted to the light-emitting element 03, thereby achieving brightness adjustment of the light-emitting element 03. For the display device 200 provided by the embodiments of the present disclosure, it is not necessary to adjust the brightness of the light-emitting element 03 by controlling a value of the light-emitting current generated by the driving circuit 01 itself. Therefore, when the driving transistor Td in the driving circuit 01 generates a small light-emitting current to achieve low light-emitting brightness of the light-emitting element 03, a problem that the driving transistor Td is affected by fluctuation of the sub-threshold swing can be avoided. Therefore, the display device 200 provided by the embodiments of the present disclosure can provide a stable and ideal light-emitting current for the light-emitting element 03, so that the light-emitting brightness of the light-emitting element 03 is basically consistent with the preset value.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A pixel driving circuit, comprising:
    a driving circuit comprising a driving transistor and configured to provide a light-emitting current to a light-emitting diode;
    a light-adjusting circuit comprising a junction field effect transistor, arranged between the driving circuit and the light-emitting diode, and configured to adjust a value of the light-emitting current; and
    a first reset circuit comprising a transistor and configured to reset the light-emitting diode,
    wherein the first reset circuit comprises an output terminal electrically connected to an input terminal of the light-adjusting circuit, and, when the first reset circuit is turned on, a control terminal of the light-adjusting circuit and the output terminal of the first reset circuit have a same potential in such a manner that the potential of the control terminal of the light-adjusting circuit is the same as a potential of the input terminal of the light-adjusting circuit.

2. The pixel driving circuit according to claim 1, wherein the light-adjusting circuit comprises a control terminal electrically connected to a light-adjusting signal line, and the light-adjusting signal line is configured to provide a light-adjusting voltage to the light-adjusting circuit; and
    wherein, during a light-adjusting stage, the light-adjusting circuit is configured to adjust the value of the light-emitting current based on the light-adjusting voltage received by the light-adjusting circuit.

3. The pixel driving circuit according to claim 1, wherein the junction field effect transistor comprises a first electrode electrically connected to an input terminal of the light-adjusting circuit, a second electrode electrically connected to an output terminal of the light-adjusting circuit, and a gate electrically connected to a control terminal of the light-adjusting circuit.

4. The pixel driving circuit according to claim 1, further comprising:
    a light-emitting control circuit comprising another transistor and configured to control the light-emitting current to be transmitted to the light-emitting diode,
    wherein the light-emitting control circuit is connected in series with the light-adjusting circuit, wherein an input terminal of one of the light-emitting control circuit and the light-adjusting circuit is electrically connected to an output terminal of the driving circuit, and an output terminal of another one of the light-emitting control circuit and the light-adjusting circuit is electrically connected to the light-emitting diode.

5. The pixel driving circuit according to claim 4, wherein, during a light-emitting stage, the light-emitting control circuit and the light-adjusting circuit are turned on.

6. The pixel driving circuit according to claim 3, wherein, during a normal light-emitting stage, the gate of the junction field effect transistor and the first electrode of the junction field effect transistor have a same potential, and the normal light-emitting stage is one of light-emitting stages of the pixel driving circuit during which no light adjusting is performed.

7. The pixel driving circuit according to claim 1, further comprising:
    a power voltage writing circuit comprising another transistor, wherein the power voltage writing circuit is electrically connected to an input terminal of the driving circuit, and configured to transmit a power voltage to the input terminal of the driving circuit.

8. The pixel driving circuit according to claim 1, wherein an output terminal of the light-adjusting circuit is electrically connected to a first electrode of the light-emitting diode.

9. A method for driving a pixel driving circuit, wherein the pixel driving circuit comprises:
- a driving circuit comprising a driving transistor and configured to provide a light-emitting current to a light-emitting diode,
- a light-adjusting circuit comprising a junction field effect transistor, arranged between the driving circuit and the light-emitting diode, and configured to adjust a value of the light-emitting current, wherein a control terminal of the light-adjusting circuit is electrically connected to a light-adjusting signal line, and
- a first reset circuit comprising a transistor and configured to reset the light-emitting diode, wherein the first reset circuit comprises an output terminal electrically connected to an input terminal of the light-adjusting circuit, and, when the first reset circuit is turned on, a control terminal of the light-adjusting circuit and the output terminal of the first reset circuit have a same potential in such a manner that the potential of the control terminal of the light-adjusting circuit is the same as a potential of the input terminal of the light-adjusting circuit; and
- wherein the method comprises:
  - during a light-adjusting stage, transmitting a light-adjusting voltage by the light-adjusting signal line, and
  - adjusting, by the light-adjusting circuit, a value of the light-emitting current by the light-adjusting voltage.

10. The method according to claim 9, wherein the junction field effect transistor comprises a first electrode electrically connected to an input terminal of the light-adjusting circuit, a second electrode electrically connected to an output terminal of the light-adjusting circuit, and a gate electrically connected to the control terminal of the light-adjusting circuit; and the junction field effect transistor is an N-channel junction field effect transistor; and
- wherein said transmitting the light-adjusting voltage by the light-adjusting signal line comprises:
  - during the light-adjusting stage, setting the light-adjusting voltage transmitted by the light-adjusting signal line to be smaller than a voltage received by the first electrode of the junction field effect transistor.

11. The drive method according to claim 9, wherein the junction field effect transistor comprises a first electrode electrically connected to an input terminal of the light-adjusting circuit, a second electrode electrically connected to an output terminal of the light-adjusting circuit, and a gate electrically connected to the control terminal of the light-adjusting circuit; and the junction field effect transistor is a P-channel junction field effect transistor; and
- wherein said transmitting the light-adjusting voltage by the light-adjusting signal line comprises:
  - during the light-adjusting stage, setting the light-adjusting voltage transmitted by the light-adjusting signal line to be greater than a voltage received by the first electrode of the junction field effect transistor.

12. The method according to claim 9, further comprising:
- during a normal light-emitting stage, transmitting, by the light-adjusting signal line, the light-adjusting voltage that is equal to a voltage of an input terminal of the light-adjusting circuit,
- wherein the normal light-emitting stage is one of light-emitting stages of the pixel driving circuit during which no light adjusting is performed.

13. The method according to claim 9, wherein an output terminal of the light-adjusting circuit is electrically connected to a first electrode of the light-emitting diode; and
- wherein the method further comprises:
  - controlling the light-adjusting circuit to be turned on by the light-adjusting voltage transmitted by the light-adjusting signal line when the first reset circuit is turned on.

14. The method according to claim 13, wherein said controlling the light-adjusting circuit to be turned on by the light-adjusting voltage transmitted by the light-adjusting signal line when the first reset circuit is turned on comprises:
- controlling the light-adjusting voltage transmitted by the light-adjusting signal line and an output terminal of the first reset circuit to have a same potential when the first reset circuit is turned on.

15. A display panel, comprising at least one pixel driving circuit,
- wherein each pixel driving circuit of the at least one pixel driving circuit comprises:
  - a driving circuit comprising a driving transistor and configured to provide a light-emitting current to a light-emitting diode;
  - a light-adjusting circuit comprising a junction field effect transistor, arranged between the driving circuit and the light-emitting diode, and configured to adjust a value of the light-emitting current; and
  - a first reset circuit comprising a transistor and configured to reset the light-emitting diode,
  - wherein the first reset circuit comprises an output terminal electrically connected to an input terminal of the light-adjusting circuit, and, when the first reset circuit is turned on, a control terminal of the light-adjusting circuit and the output terminal of the first reset circuit have a same potential in such a manner that the potential of the control terminal of the light-adjusting circuit is the same as a potential of the input terminal of the light-adjusting circuit.

16. The display panel according to claim 15, wherein the light-adjusting circuit comprises a control terminal electrically connected to a light-adjusting signal line, and the light-adjusting signal line is configured to provide a light-adjusting voltage to the light-adjusting circuit; and
- wherein the light-adjusting signal line extends along a first direction, the at least one pixel driving circuit comprises at least two pixel driving circuits, and at least two of the at least two pixel driving circuits are arranged along the first direction and are electrically connected to a same light-adjusting signal line.

17. A display device, comprising the display panel according to claim 15.

* * * * *